United States Patent [19]

Kawagoe et al.

[11] Patent Number: 5,617,267
[45] Date of Patent: Apr. 1, 1997

[54] SERVO DATA WRITING APPARATUS FOR SUPPORTING THE FREE END OF A ROTATING SHAFT IN A MAGNETIC DISK DEVICE AND METHOD OF WRITING SERVO DATA

[75] Inventors: Seiji Kawagoe; Kazuhiko Iwase; Haruo Shibata, all of Tokyo, Japan

[73] Assignee: Kabushiki Kaisha Toshiba, Kanagawa-ken, Japan

[21] Appl. No.: 361,635

[22] Filed: Dec. 22, 1994

[30] Foreign Application Priority Data

Dec. 15, 1994 [JP] Japan ..................... 6-311709

[51] Int. Cl.⁶ ............................................. G11B 5/596
[52] U.S. Cl. ............................ 360/77.02; 360/98.07
[58] Field of Search ........................... 360/77.02, 106, 360/72.2, 48, 137, 99.08, 99.09, 98.07; 369/44.15

[56] References Cited

U.S. PATENT DOCUMENTS

| | | | |
|---|---|---|---|
| 3,641,529 | 2/1972 | Bitzer et al. | 360/75 |
| 4,920,442 | 4/1990 | Dimmick | 360/137 |
| 4,980,783 | 12/1990 | Moir et al. | 360/77.02 |
| 5,162,955 | 11/1992 | Burdenko | 360/77.02 |

FOREIGN PATENT DOCUMENTS

| | | |
|---|---|---|
| 5-36654 | 5/1993 | Japan . |
| 5-225730 | 9/1993 | Japan . |

*Primary Examiner*—Aristotelis Psitos
*Assistant Examiner*—Patrick Wamsley
*Attorney, Agent, or Firm*—Limbach & Limbach L.L.P.

[57] ABSTRACT

An HDD, to which servo data is written, is fixed on a base. As an upper base moves, a both-end supporting mechanism provided on the upper base approaches a rotation shaft which supports a disk. When the both-end supporting mechanism is brought into full contact with the tip portion of the free end of the rotation shaft, a process of writing servo data is carried out on the disk. While writing the servo data, the rotation shaft is maintained in the both-end supported state, and therefore a non-repeatable vibration of the rotation shaft caused by a rotation of a spindle motor is suppressed. After the servo data writing process, the both-end supporting mechanism is withdrawn from the rotation shaft as the upper base moves.

17 Claims, 12 Drawing Sheets

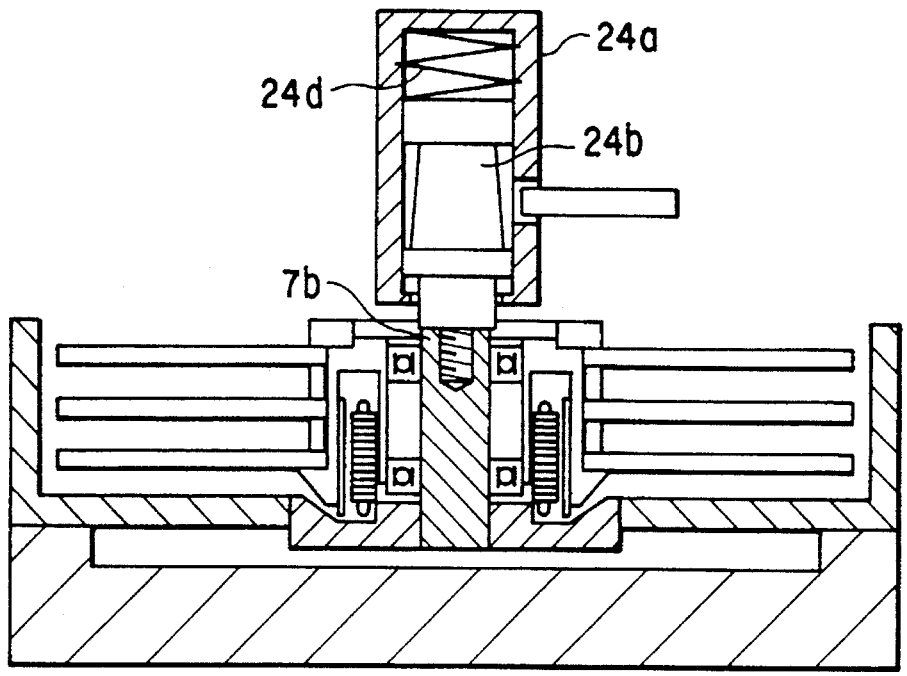
F I G. 9A
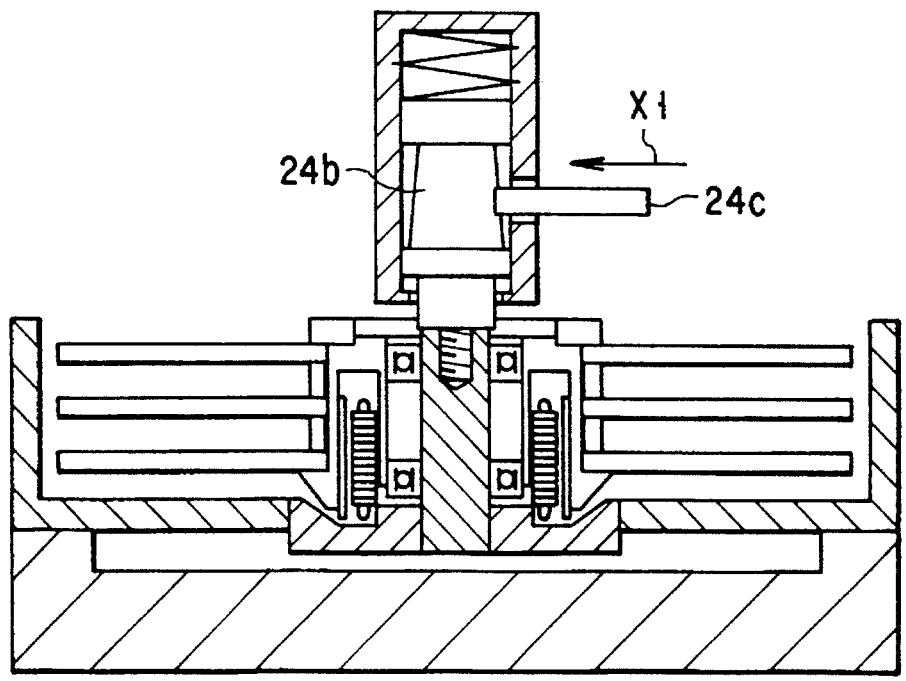
F I G. 9B

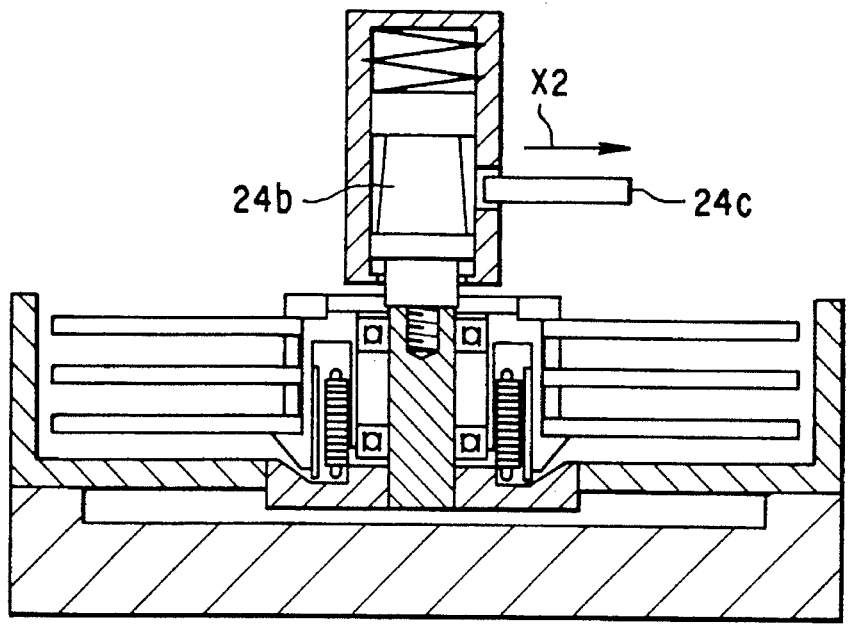
F I G. 10A
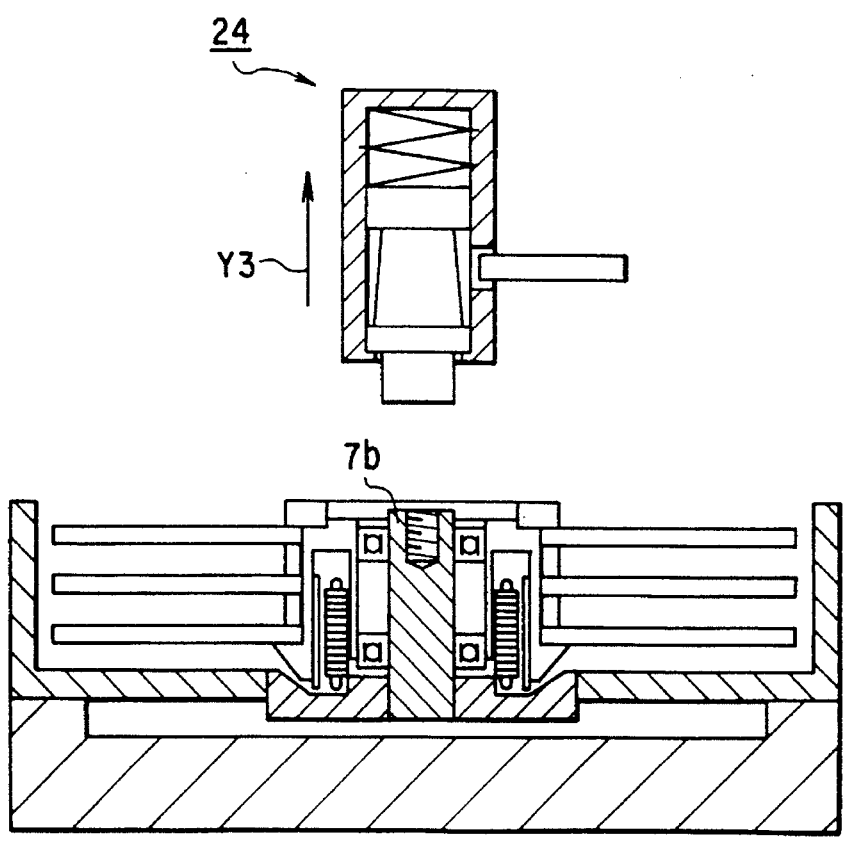
F I G. 10B

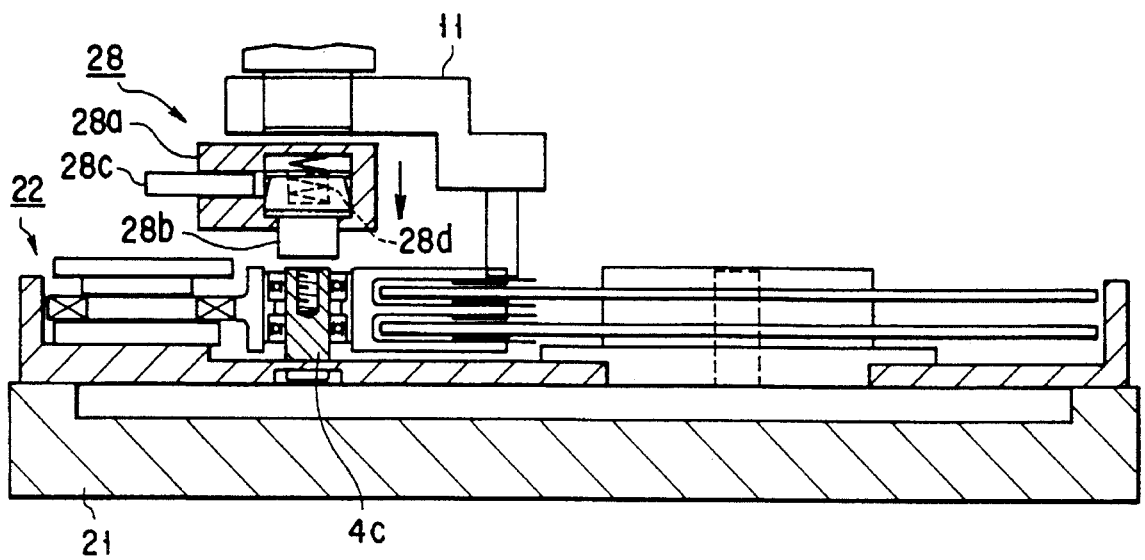
F I G. 13A
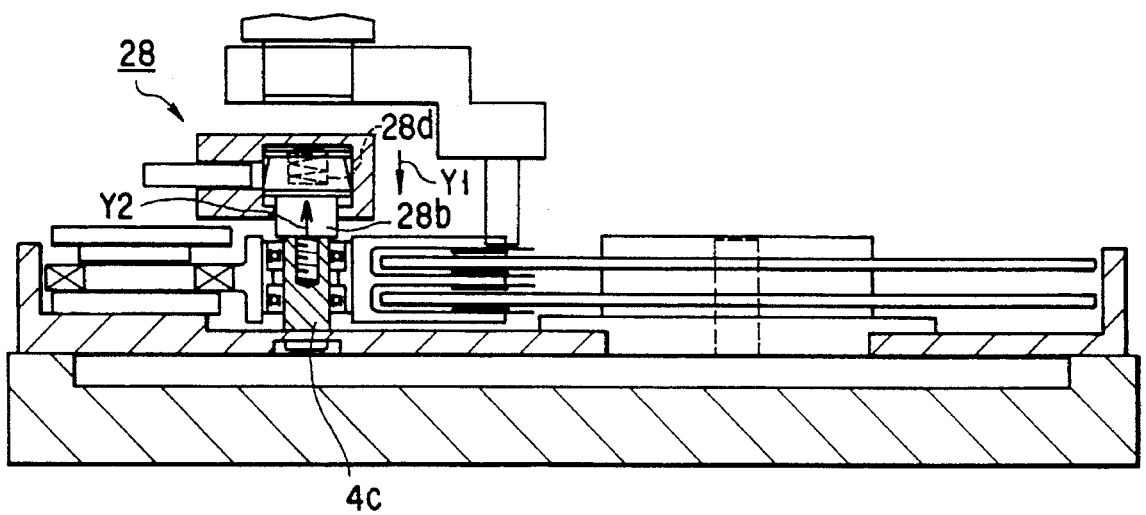
F I G. 13B
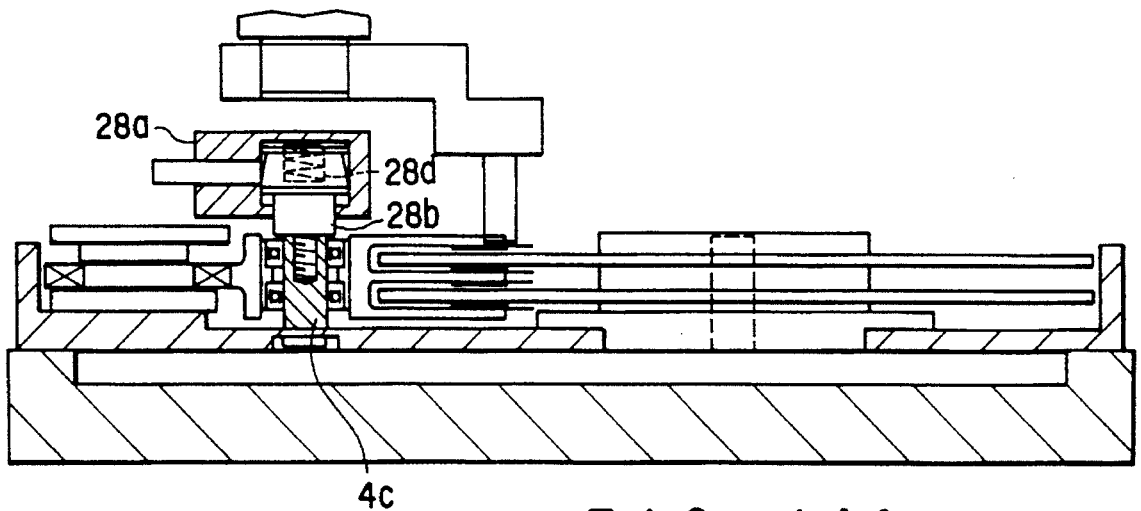
F I G. 14A

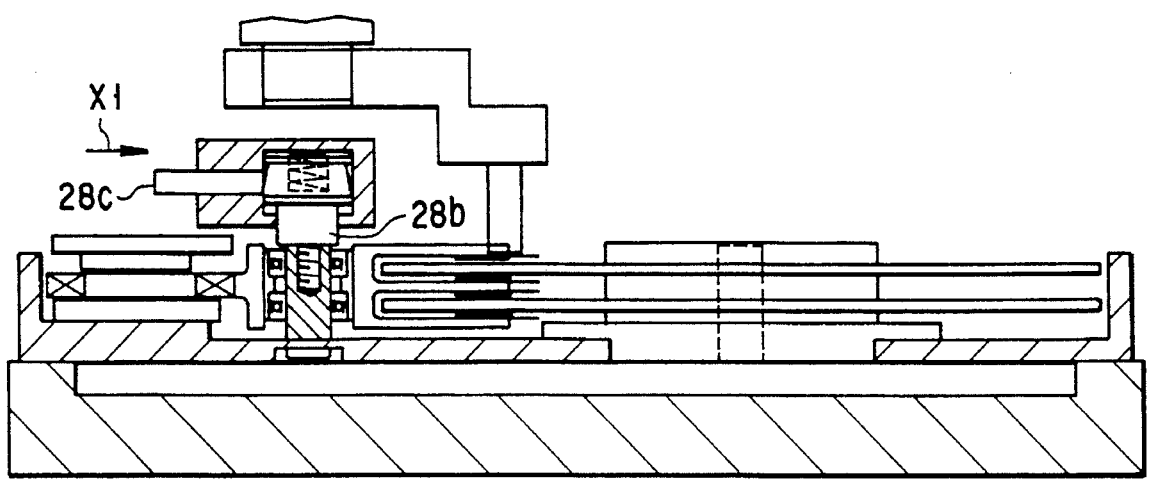
F I G. 14B
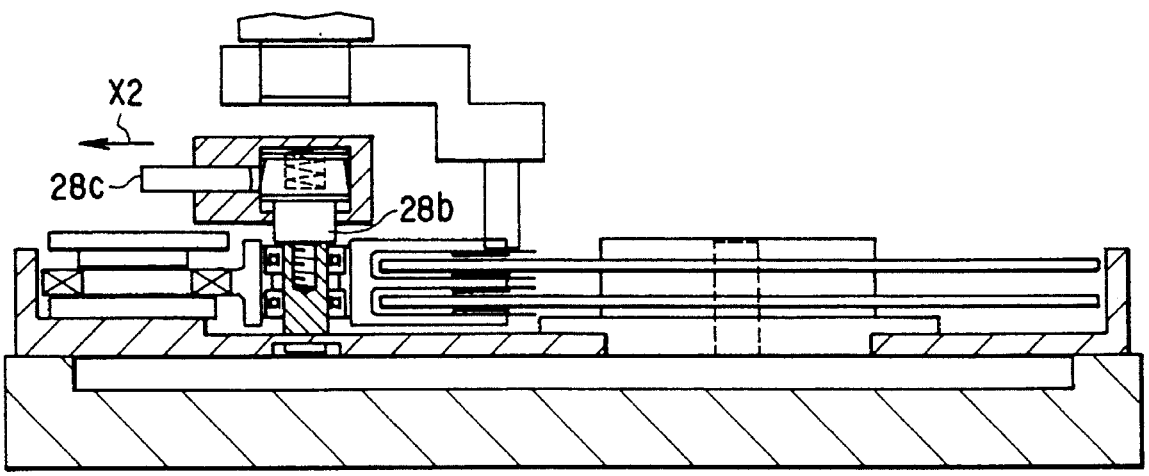
F I G. 15A
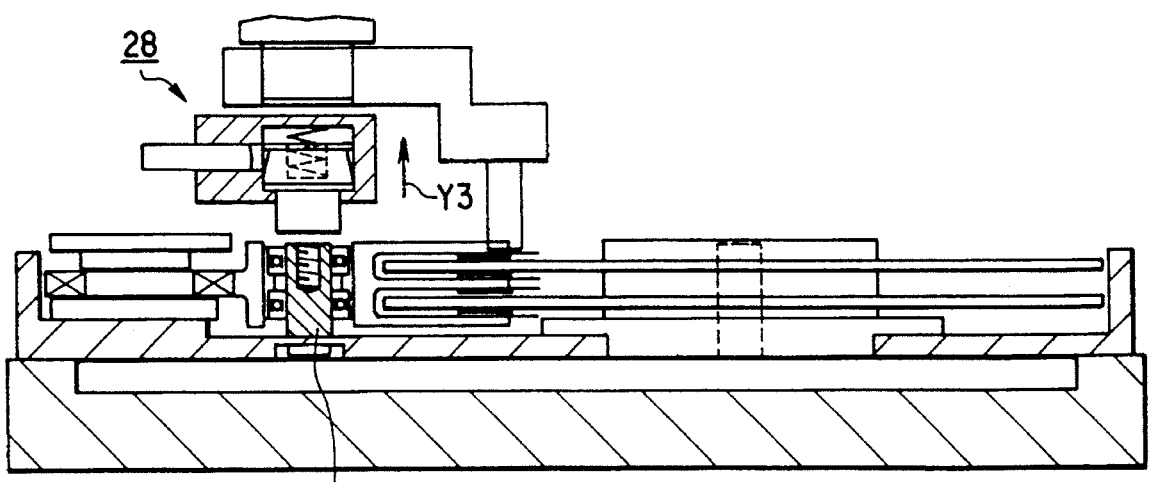
F I G. 15B

SERVO DATA WRITING APPARATUS FOR SUPPORTING THE FREE END OF A ROTATING SHAFT IN A MAGNETIC DISK DEVICE AND METHOD OF WRITING SERVO DATA

BACKGROUND OF THE INVENTION

1. Field of the Invention

The present invention relates to a servo data writing apparatus for writing servo data on a disk of a hard disk drive, and method of writing servo data on a disk, more specifically to a servo data writing apparatus which can write servo data on the disk while suppressing the vibration caused by the rotation mechanism as it rotates, and a method therefor.

2. Description of the Related Art

A conventional compact hard disk drive has a structure as shown in FIG. 1, in which a disk 2, a head 3, a head movement mechanism (or carriage mechanism) 4, a disk rotation mechanism 7, and the like are housed in a metal-made case 1. The case 1 is closed by a top cover 5. The top cover 5 can be set on or removed from the case with fixation screws. A disk 2 is fixed in the disk rotation mechanism 7. The disk rotation mechanism 7 rotates the fixed disk 2 at a high speed. In order to achieve the high-speed rotation, a spindle motor which will be described later is provided in the disk rotation mechanism 7. The head movement mechanism 4 includes a swing arm 4a for moving the head 3 above the disk 2 via a suspension 3a, a voice coil motor 4b for swinging the swing arm 4a in the radial direction of the disk 2, a rotation shaft 4c for supporting the swing arm 4a and the like.

FIG. 2A is a cross section of the vicinity of the disk rotation mechanism in the HDD from which the top cover is removed. As shown in this figure, the disk rotation mechanism 7 includes a disk press member 7a, a rotation shaft 7b, a bearing 7c, a tapped hole 7d, a hub 7e, a spacer ring 7f, a spindle motor 7g, and the like. The hub 7e fixes, for example, three disks 2. The spacer ring 7f mounted to the hub 7e serves to maintain an axial-directional distance between each adjacent pair of disks 2, at constant. The disk press member 7a presses the disks and the spacer ring 7f in the axial direction. The rotation shaft 7b is supported by the bearing 7c. A tip end of the free end side of the rotation shaft 7b has a tapped hole 7b formed such as to be engaged with one of fixation screws 6 when the top cover is set. The spindle motor 7g rotates the hub 7e on which the disks 2 and the like are set, around the rotation shaft 7b.

FIG. 2B is a cross section of the vicinity of the disk rotation mechanism in the HDD to which the top cover 5 is set. As shown in this figure, when the top cover 5 is set, one of the fixation screws 6 is engages with the tapped hole 7d of the rotation shaft 7b. In this case, the tip end portion of the free end side of the rotation shaft 7b is fixed by the top cover 5, and therefore the non-repeatable vibration of the rotation shaft 7b caused by the rotation of the spindle motor 7g is suppressed.

FIG. 3A is a cross section of the vicinity of the head movement mechanism in the HDD from which the top cover is removed 5. As shown in this figure, the head movement mechanism 4 includes, in addition to the swing arm 4a and the voice coil motor 4b, a rotation shaft 4c, a bearing 4d, a tapped hole 4e, and the like. The rotation shaft 4c is supported by the bearing 4d. A tip end of the free end side of the rotation shaft 7b has a tapped hole 4e formed such as to be engaged with one of fixation screws 6 when the top cover is set. The voice coil motor 4b rotates the swing arm 4a around the rotation shaft 4c.

FIG. 3B is a cross section of the vicinity of the head movement mechanism in the HDD to which the top cover 5 is set. As shown in this figure, when the top cover 5 is set, one of the fixation screws 6 is engages with the tapped hole 4e of the rotation shaft 4c. In this case, the tip end portion of the free end side of the rotation shaft 4c is fixed by the top cover 5, and therefore the non-repeatable vibration of the rotation shaft 4c caused by the rotation of the spindle motor 7g is suppressed.

During the manufacture of an HDD, usually, a process for writing servo data used for controlling the positioning of the head 3 is carried out. FIG. 4 is a perspective view illustrating that the servo data is written on a disk 2. In the case where the sector servo mode is employed, a user area for recording user data and a servo area for recording servo data are provided on the data surface of the disk 2. When servo data is written, an exclusive servo data writing apparatus, which is a so-called Servo writer, is generally used. A base (not shown) for fixing the case 1 of the HDD is provided for the servo writer. The servo writer writes servo data at a predetermined position of the disk 2 by using the head movement mechanism 4 built in the HDD.

Further, the servo writer includes a clock head 10 and a positioning actuator mechanism 11. The clock head 10 records a reference clock necessary for writing the servo data, on the disk 2. The clock head 10 is supported by the suspension 10a. The suspension 10a is mounted to a clock head supporting mechanism (not shown). Meanwhile, the positioning actuator mechanism 11 positions the head 3 at a position to which the servo data is to be recorded. A positioning pin 11a is provided for the positioning actuator mechanism 11. The positioning pin 11a positions the head 3 supported by the suspension 3a, to a predetermined position by guiding the swing arm 4a.

There are several techniques for writing servo data by means of a servo writer. According to the first technique, a writing process is carried out directly on a disk when the top cover is removed from the HDD as can be seen in FIG. 4. That is, servo data is written while the tip portion of the free end side of the rotation axis 7b in the disk rotation mechanism is released (to be called one-end supporting state, hereinafter). In this case, the top portion of the free end side of the rotation shaft 7b is not supported, and therefore the non-repeatable vibration of the rotation shaft 7b caused by the rotation of the spindle motor 7g is enhanced. In similar manner, the tip portion of the free end side of the rotation shaft 4c is not supported, and therefore the non-repeatable vibration of the rotation shaft 4c which supports the swing arm 4a is enhanced. Consequently, servo data containing a large amount of vibration component is written on the disk 2. As a result, the positioning accuracy of the case where the positioning control of the head 3 is actually carried out after the writing of the servo data based on the servo data recorded on the disk 2, is deteriorated.

According to the second technique, a dummy cover 12, which substitutes for the top cover, is mounted on the HDD. The dummy cover 12 is fixed to the case 1 by a plurality of fixation screws 12a. One of the fixation screws 12a is engaged with the tapped hole 7d provided in the rotation shaft 7b. Therefore, similar to the case where the top cover is set, servo data is written while the tip portion of the free end side of the rotation shaft 7b is supported (to be called a both-end supporting state). Consequently, the non-repeatable vibration of the rotation shaft 7b is suppressed. Meanwhile, when the dummy cover 12 is mounted as shown in FIG. 5B, the rotation shaft 4c can be held in the both-end supporting state. Thus, the non-repeatable vibration of the rotation shaft 4c is suppressed, and the servo data can be written at a high accuracy. However, in this technique, the operation of setting and removing the dummy cover 12, which is time-and-labor consuming, is required. Further, during the setting or removing operation, dust is likely to enter the HDD.

Lastly, according to the third technique, the writing operation is carried out while the top cover 5 is set. In this case, openings 13a and 13b are provided in the top cover 5 so that the clock head 10 and the positioning pin 11a are able to move within a predetermined region. With this structure, the writing of the servo data can be carried out while the rotation shaft 7b and the rotation shaft 4c are in the both-end supporting state. However, in this technique, the strength of the top cover 5 is decreased because of the openings 13a and 13b. Therefore, the non-repeatable vibration of the rotation shaft 7b and the rotation shaft 4c cannot be sufficiently suppressed. Further, after the completion of the writing of servo data, the openings 13a and 13b must be sealed.

SUMMARY OF THE INVENTION

The object of the present invention is to provide a servo data writing apparatus and a method which can achieve a highly accurate servo data writing process, when writing servo data on a disk in a hard disk drive, without requiring a complicated work such as the setting or removal of a dummy cover or a specially processed top cover, or a sealing process.

In order to achieve the above-described object, there is provided a servo data writing apparatus comprising: a magnetic disk device including a rotation mechanism for rotating a recording medium, a head mechanism for writing servo data as positioning data on the recording medium, and a carriage mechanism for moving the head mechanism; a base for fixing the magnetic disk device; head positioning means for positioning the head mechanism; first supporting means for supporting the free end of the rotation shaft of the recording medium so as to suppress the vibration caused by the rotation of the recording medium; and second supporting means for supporting the free end of the rotation shaft of the carriage mechanism so as to suppress the vibration caused by the rotation of the recording medium.

According to the present invention, with the above-described structure, the setting or removal of a dummy cover or a specially processed top cover, or a sealing process, are no longer required. Further, dust does not easily enter the apparatus. Moreover, the internal mechanism of the hard disk drive is maintained accurately in the both-end supported state while writing servo data. As a result highly accurate servo writing process can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 9A and 9B are lateral cross sections illustrating that the both-end supporting mechanism which is in contact with the rotation shaft supporting the disks is locked, in the first embodiment;

FIGS. 10A and 10B are lateral cross sections illustrating that the both-end supporting mechanism is withdrawn from the rotation shaft which supports disks, in the first embodiment;

FIGS. 13A and 13B are lateral cross sections illustrating that the both-end supporting mechanism is brought into contact with the rotation shaft which supports a swing arm, in the second embodiment;

FIGS. 14A and 14B are lateral cross sections illustrating that the both-end supporting mechanism which is in contact with the rotation shaft supporting the swing arm is locked, in the second embodiment; and FIGS. 15A and 15B are lateral cross sections illustrating that the both-end supporting mechanism is withdrawn from the rotation shaft which supports the swing arm, in the second embodiment.

DETAILED DESCRIPTION OF THE PREFERRED EMBODIMENTS

Embodiments of the present invention will now be described with reference to drawings.

Figure 1:
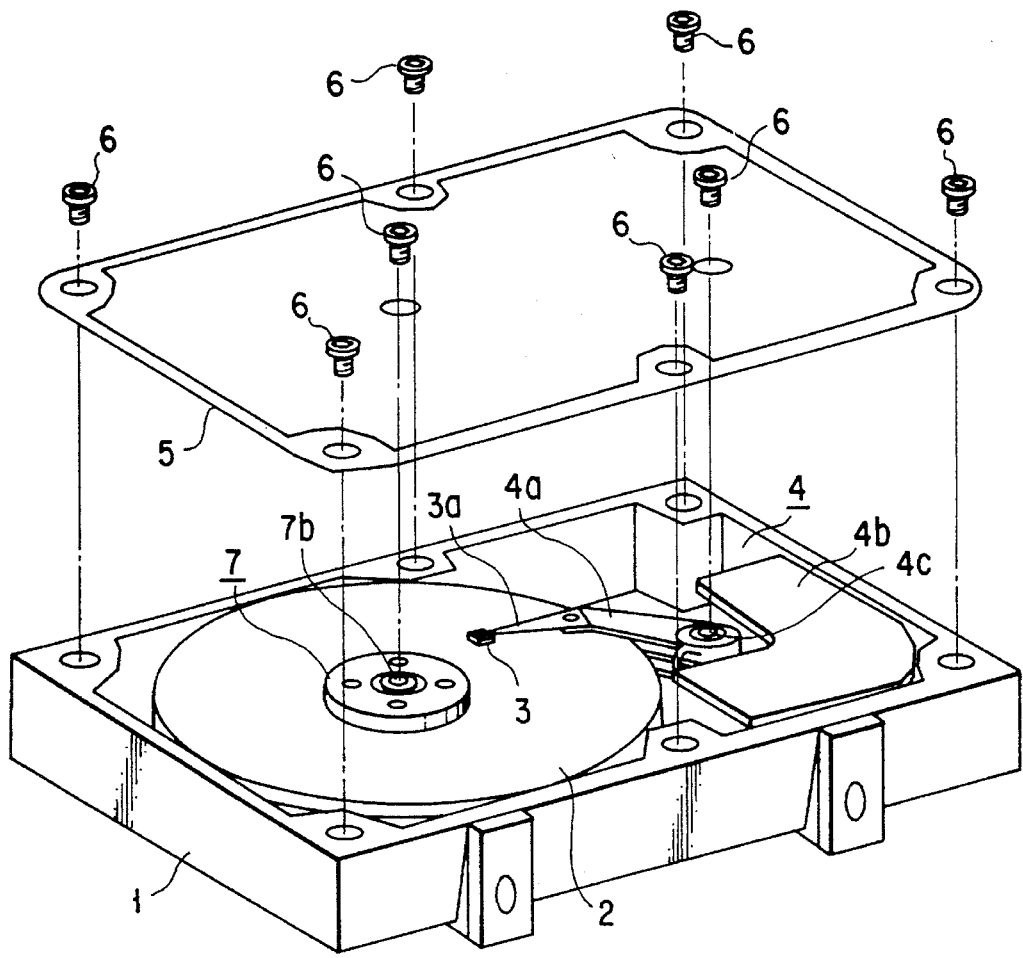
FIG. 1 is a perspective view showing the structure of a conventional HDD.
Figure 2A:
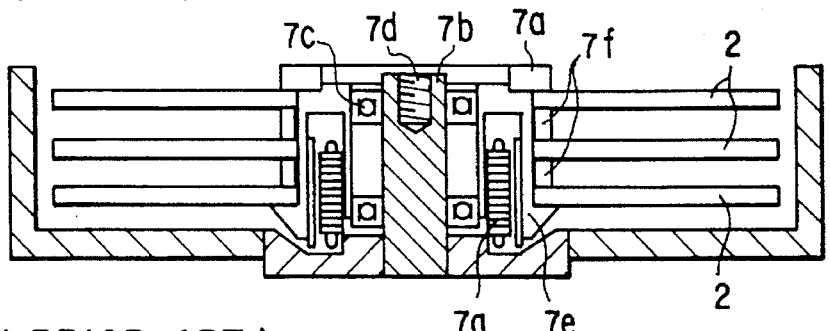
FIGS. 2A and 2B are lateral cross sections showing the vicinity of the disk rotation mechanism in the conventional HDD.
Figure 2B:
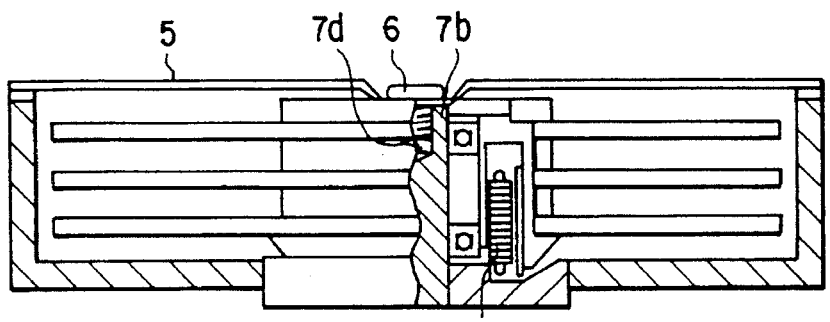
Figure 7:
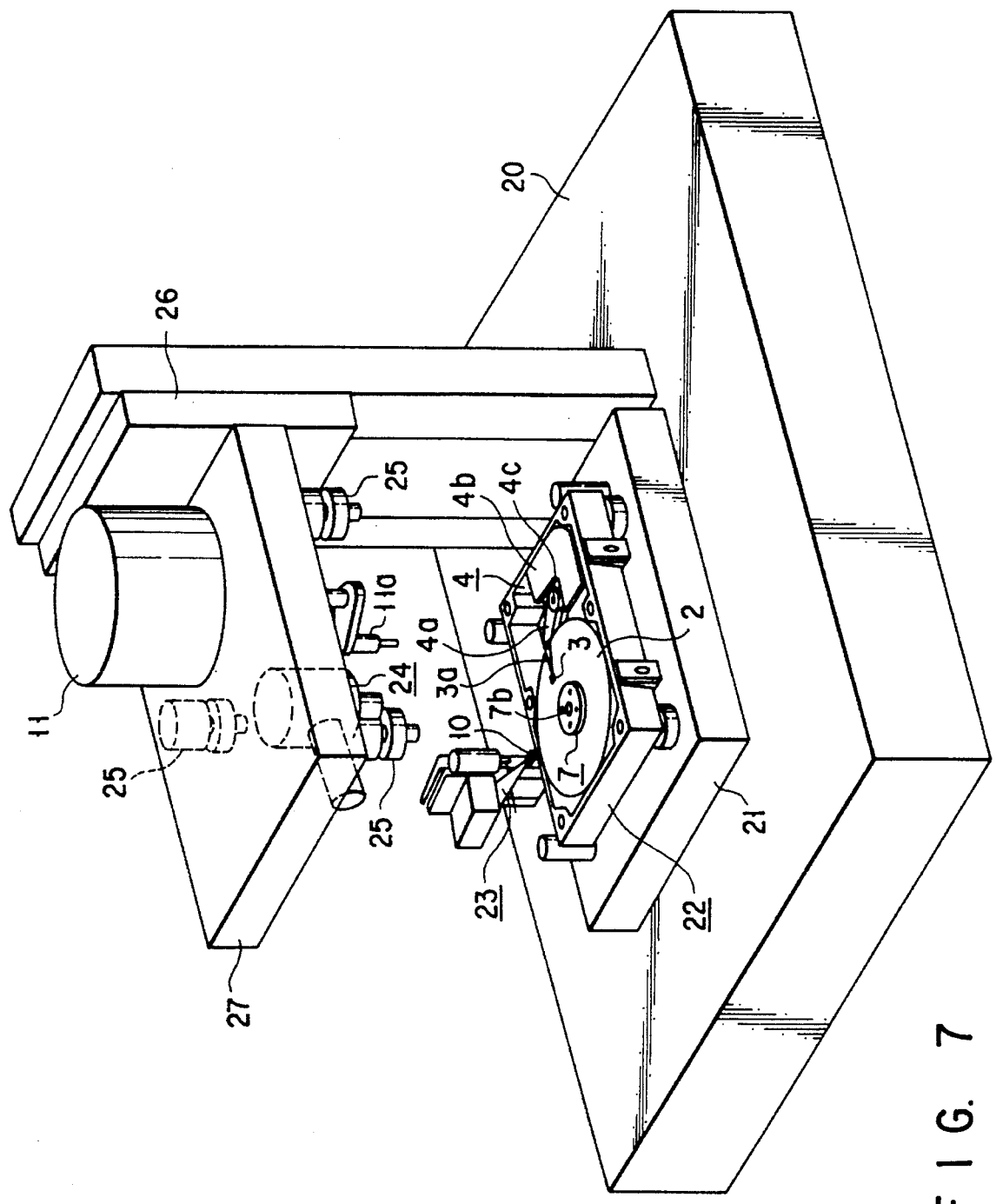
FIG. 7 is a perspective view showing the overall structure of a servo data writing apparatus according to the first embodiment of the present invention.

FIG. 7 is a perspective view showing the overall structure of a servo data writing apparatus according to the first embodiment of the present invention. The apparatus according to the first embodiment includes a lower base 20 of the main body of the apparatus, a standard base 21 for fixing a hard disk drive (HDD) 22, on which servo data is written, and an upper base 27 of the main body. The HDD has the same mechanism as that of the conventional HDD. In the following description, FIGS. 1 and 2A are referred to in accordance with necessity. It is supposed in the following description that the top cover 5 is removed.

A vertical-directional sliding mechanism 26 moves the upper base 27 in the vertical direction (the direction of the rotation axis of the HDD 22). On the upper base 27, a plurality of vertical-directional clamping mechanisms 25, a both-end supporting mechanism 24 and a positioning actuator mechanism 11 having a positioning pin 11a are set.

The upper base 27 moves down to a predetermined position and each of the vertical-directional clamping mechanisms 25 clamps the HDD 22. That is, the upper base 27 is moved in the direction where the HDD 22 is located, by the vertical-positional sliding mechanism 26. When the vertical-directional clamping mechanism 25 is brought into contact with the HDD 22, the upper base 27 is clamped. The vertical-directional sliding mechanism 26 stops at a position where the vertical-directional clamping mechanism 25 is brought into contact with the HDD 22. In this apparatus, a horizontal-directional clamping mechanism (not shown) for clamping the upper base 27 at a predetermined horizontal position, is provided, but not shown in FIG. 7.

The both-end supporting mechanism 24 maintains the rotation shaft 7b in the HDD 22 from which the top cover 5 is removed, in the both-end support state, when the upper base 27 (FIG. 1) is clamped by the vertical-directional clamping mechanism.

The positioning actuator mechanism 11 is designed for positioning the head 3 in the HDD 22 at a position (on a disk 2) to which servo data is to be recorded. While positioning, the positioning pin 11a moves the swing arm 4a.

Further, this apparatus includes a clock head mechanism 23 for driving a clock head 10. The clock head 10 records a reference clock necessary for writing servo data, on the disk 2.

Figure 8A:
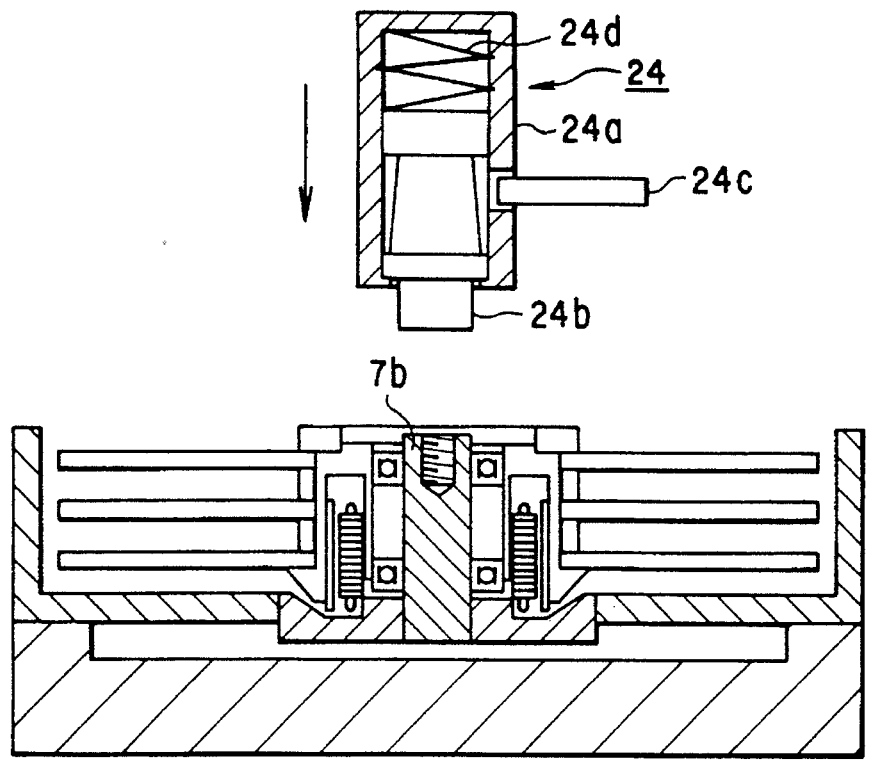
FIGS. 8A and 8B are lateral cross sections illustrating that the both-end supporting mechanism is brought into contact with the rotation shaft which supports disks, in the first embodiment.

The above-mentioned both-end supporting mechanism 24 consists of a housing 24a which is the main body of this mechanism, a shaft-supporting piston member 24b, a lock pin member 24c and a spring member 24d, as shown in FIG. 8A. In the housing 24a, the shaft supporting piston member 24b is pressed by the spring member 24d in the direction indicated by the arrow. Further, the housing 24a has a mechanism for maintaining the shaft-supporting piston member 24b pressed such that a portion thereof is located outside. The lock pin member 24c is designed for suppressing the vertical directional movement of the shaft-supporting piston member 24b when the shaft-supporting piston member 24b is in contact with the tip portion of the free end of the rotation shaft 7b.

Next, the operation of this embodiment will be described.

First, the HDD 22 to which servo data are to be written, is fixed on the standard base 21 as can be seen in FIG. 7. Then, the upper base 27 is moved in the direction where the HDD 22 is located, as driven so by the vertical-directional sliding mechanism 26.

In accordance with the movement of the upper base 27, the both-end supporting mechanism 22 set on the upper base 27 approaches the HDD 22. During this period, as shown in FIG. 8A, the shaft-supporting piston member 24b contained in the both-end supporting mechanism 24 approaches the tip portion of the free end of the rotation axis 7b.

Figure 8B:
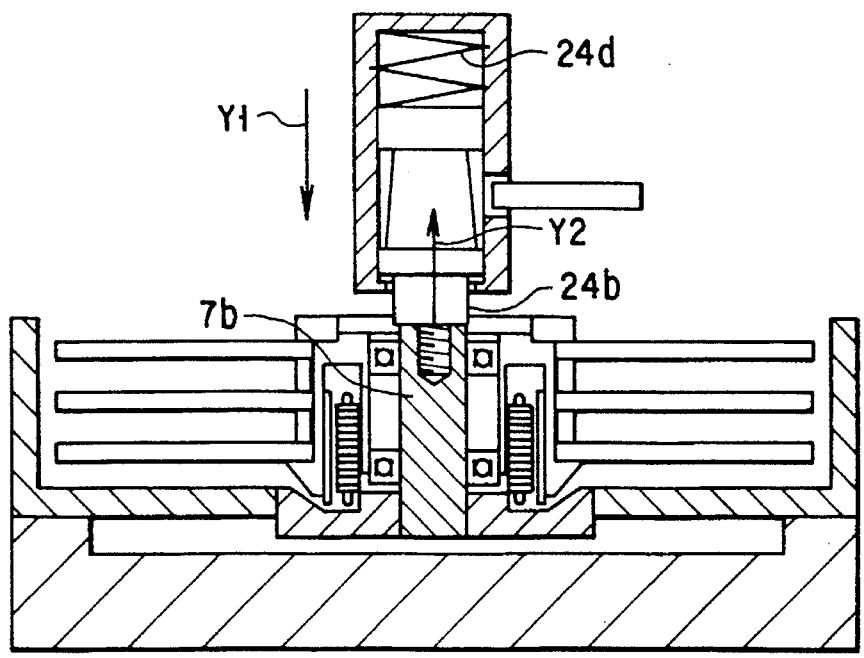

Further, as can be seen in FIG. 8B, the both-end supporting mechanism 24 moves in the direction indicated by arrow Y1 until the shaft-supporting piston member 24b is brought into full contact with the tip portion of the free end of the rotation shaft 7b. The tip portion of the shaft-supporting piston member 24b has such a shape that it can be brought into full contact with the rotation shaft 7b, for example, a columnar or conical shape. When the shaft-supporting piston member 24 is brought into full contact with the rotation axis 7b, the spring member 24d is pressed in the direction indicated by arrow Y2 by reaction. While being pressed, the vertical-directional clamping mechanism 25 is brought into contact with the HDD 22 (the movement of the upper base 27 is stopped). Thus, as shown in FIG. 9A, the shaft-supporting piston member 24b in the housing 24a is maintained to be in full contact with the rotation shaft 7b by a constant pressure applied by the spring member 24d.

Next, as can be seen in FIG. 9B, the lock pin 24c moves in the direction indicated by arrow X1 so as to press the shaft-supporting piston member 24b. Thus, the movement of the shaft-supporting piston member 24b is locked. The lock pin 24c is connected with a piston of an air cylinder (not shown). Note that the lock pin 24c may be a piston of the air cylinder. The air cylinder actuator (not shown) moves the lock pin 24c by an air pressure.

In this state, the disk 2 starts to rotate as it is driven by the spindle motor 7g contained in the disk rotation mechanism 7 in the HDD 22. The positioning actuator mechanism 11 moves the swing arm 4a by using the positioning pin 11a. In this manner, the positioning actuator mechanism 11 positions the head 3 at a predetermined position on the disk 2. During this period, the head movement mechanism 4 moves the head 3 towards the inner circumferential side of the disk 2 by controlling the swing arm 4a. The positioning pin 11a controls the swing-arm 4a such as to oppose the movement force of the head movement mechanism 4, thus positioning the head 3. When the positioning is completed, servo data is written by the head 3. It should be noted that the HDD 22 includes a servo data writing circuit (not shown) for carrying out the writing of servo data with the head 3. In an actual execution of the writing of servo data, a reference clock signal is recorded on the disk 2 by the clock head 10.

During the servo data writing process, the rotation shaft 7b which supports the disk 2 is sufficiently pressed by the shaft-supporting piston member 24b, and therefore the both-end support state is maintained. Consequently, the non-repeatable vibration of the rotation shaft 7b caused by the rotation of the spindle motor 7g is suppressed, and the non-repeatable vibration is not propagated to the disk 2. Therefore, the servo data can be written at a high accuracy without mixing an undesired component into the data due to the vibration.

When the servo data writing process is completed, the lock pin member 24c is moved in the direction indicated by arrow X2 by the air cylinder (not shown) as can be seen in FIG. 10A. Thus, the locked state of the shaft-supporting piston member 24b is released. Then, the upper base 27 is moved in the direction away from the HDD 22, as driven by the vertical-directional sliding mechanism 26. Therefore, as can be seen in FIG. 10B, the both-end supporting mechanism 24 moves in the direction away from the rotation shaft 7b (as indicated by arrow Y3). When the upper base 27 is separated sufficiently away from the HDD 22, the HDD 22 is removed from the standard base 21. Then, the top cover 5 is set on the HDD 22.

A series of the above-described operations is executed by the computer (not shown) provided in the servo data writing apparatus. For example, the computer is in advance equipped with a program designed for the above-described procedure. In accordance with the program, the computer controls the operation of each of the mechanisms such as the vertical-directional sliding mechanism 26 and the positioning actuator mechanism 11.

The above description is directed to the case where the HDD 22 is a type in which it originally has a rotation shaft of the both-end supporting mechanism; however, apart from the both-end supporting mechanism, there is also the one end supporting mechanism as a supporting mechanism for a rotation shaft which supports disks. Therefore, the handling of an HDD of the type having a rotation shaft of the one-end supporting mechanism, may be considered. For an actual servo data writing step, a servo data writing apparatus which can handle both types of HDDs is desired.

In the case where an HDD having a rotation shaft of the both-end supporting mechanism is handled, the servo data writing process can be carried out by the abovedescribed operation. More specifically, the both-end supporting mechanism 24 having the shaft-supporting piston member 24b approaches the rotation shaft 7b. After the shaft-supporting piston member 24b is brought into full contact with the rotation shaft 7b, the writing of servo data is carried out.

In the case where an HDD having a rotation shaft of the one-end supporting mechanism is handled, servo data must be written while the shaft-supporting piston member 24b is not in contact with the rotation shaft 7b. In this case, the shaft-supporting piston member 24b is withdrawn from the rotation shaft of the one-end supporting mechanism. There are the following two withdrawing techniques. The first technique is that the both-end supporting mechanism 24 including the shaft-supporting piston member 24b is entirely withdrawn, and the second technique is that only the shaft-supporting piston member 24b is withdrawn.

Figure 11A:
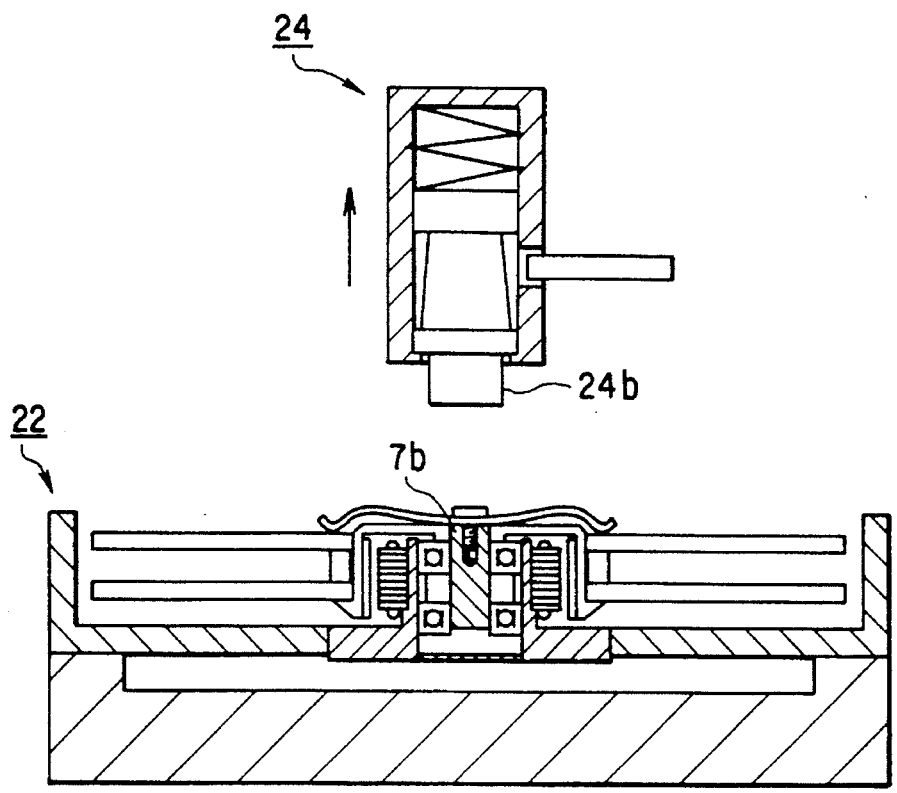
FIGS. 11A and 11B are lateral cross sections illustrating that the both-end supporting mechanism or the piston is withdrawn from the rotation shaft of the one-end support spindle motor, in the first embodiment.
Figure 11B:
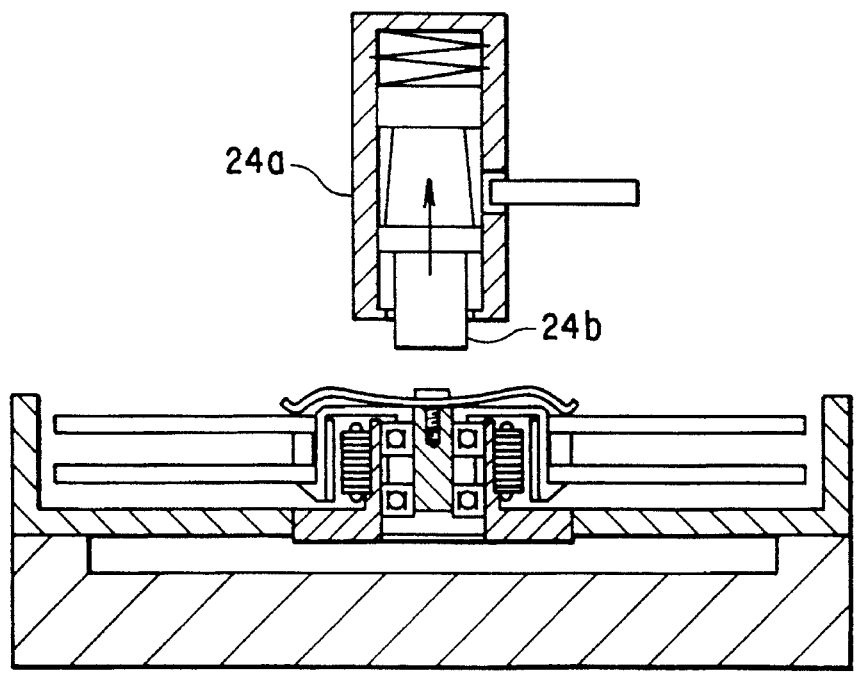

According to the first technique, in the case where an HDD 22 having a rotation shaft of the one-end supporting mechanism is set, the entire both-end supporting mechanism 24 including the shaft-supporting piston member 24b is moved, as shown in FIG. 11A, in the direction indicated by the arrow, from the rotation shaft 7b. In this case, the withdrawal of the entire both-end supporting mechanism 24 is performed by the movement of the upper base. After the withdrawal of the both-end supporting mechanism 24, the writing of servo data is carried out. According to the second technique, only the shaft-supporting piston member 24b is moved, as shown in FIG. 11B, in the direction indicated by the arrow, from the rotation shaft 7b. In other words, the shaft-supporting piston member 24b slides in the housing 24a. The withdrawal of the shaft-supporting piston member 24b is performed by hanging it at a predetermined position in the housing 24a with the help of an actuator (not shown). During this period, the housing itself does not move. After the withdrawal of the shaft-supporting piston member 24b, the writing of servo data is carried out.

As described, according to this embodiment, the both-end supporting mechanism is employed in the servo data writing apparatus, and therefore the non-repeatable vibration of the rotation shaft 7b is sufficiently suppressed in similar to or better than the conventional method in which a dummy cover is provided, or a top cover having an opening is set. Further, the nonrepeatable vibration is not propagated to the disks 2. Therefore, a highly accurate servo data writing which keeps the vibration components to a minimum can be achieved.

Moreover, according to this embodiment, the both-end supporting mechanism 24 supports the rotation shaft 7b or release the supporting state in accordance with the movement of the upper base. While the both-end supporting mechanism 24 is maintaining the supporting state for the rotation shaft 7b, the positioning actuator mechanism 11 controls the position of the head 3. Therefore, when performing a servo data writing process, the setting or removing of a dummy cover, or a top cover having an opening, which is time and labor consuming, is not required. Further, during the operation of the servo data writing apparatus, dusts do not easily enter the inside of the HDD 22. Furthermore, since it is not necessary to set or remove the cover and the like, a special processing such as providing an opening in the cover and the like, or a work of sealing an opening is no longer required.

Moreover, in any case where the HDD 22 having the rotation shaft of the both-end supporting mechanism, or the HDD 22 having the rotation shaft of the one-end supporting mechanism is set on the standard base, the supporting or non-supporting state for the rotation shaft can be easily and quickly switched. Consequently, an servo data writing process appropriate for the type of a supporting mechanism can be achieved.

Next, the second embodiment will be described.

Figure 3A:
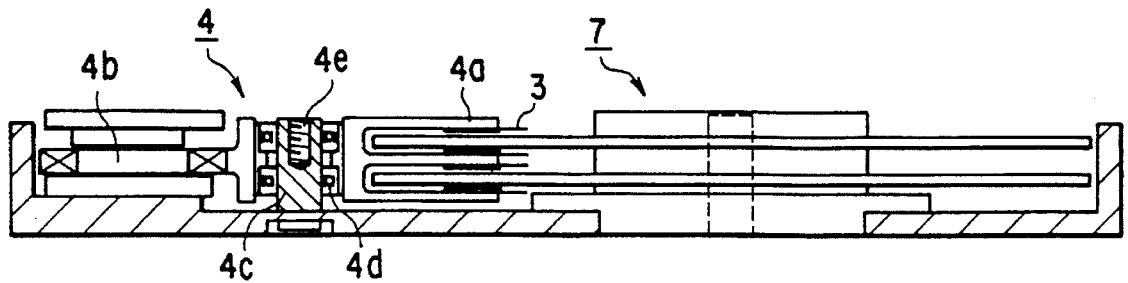
FIGS. 3A and 3B are lateral cross sections showing the vicinity of the head movement mechanism in the conventional HDD.
Figure 3B:
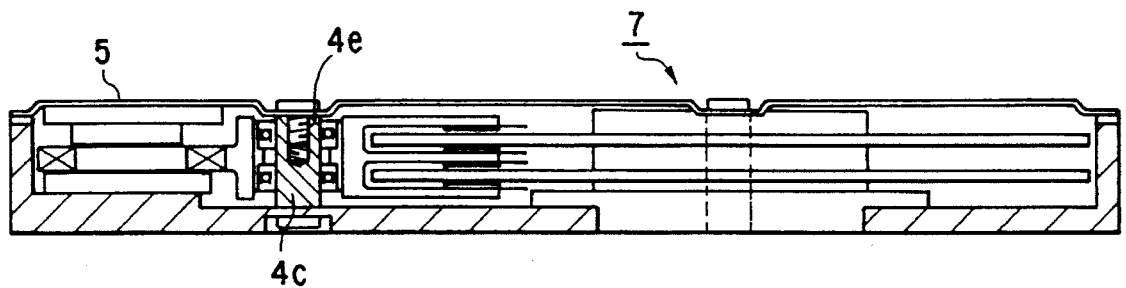
Figure 4:
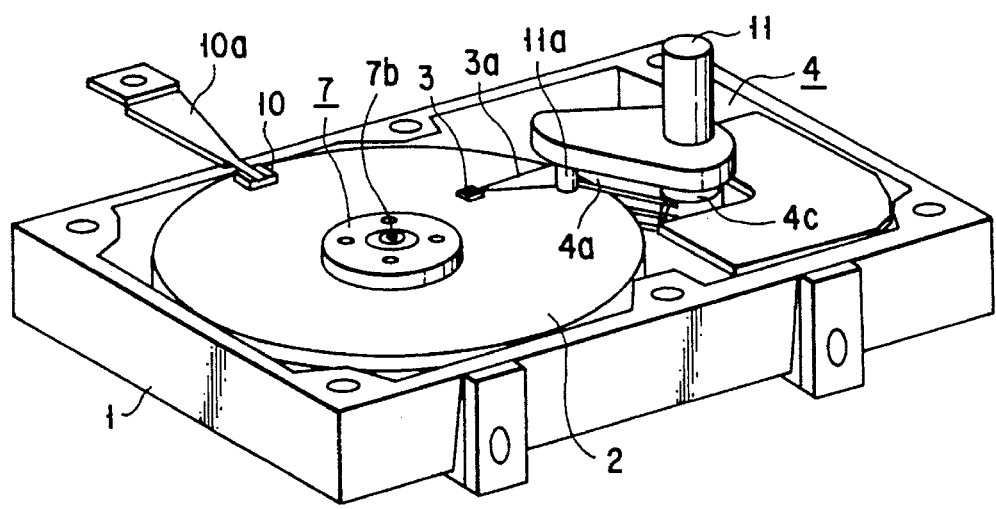
FIG. 4 is a perspective view illustrating that servo data is written on a disk by the conventional technique.
Figure 5A:
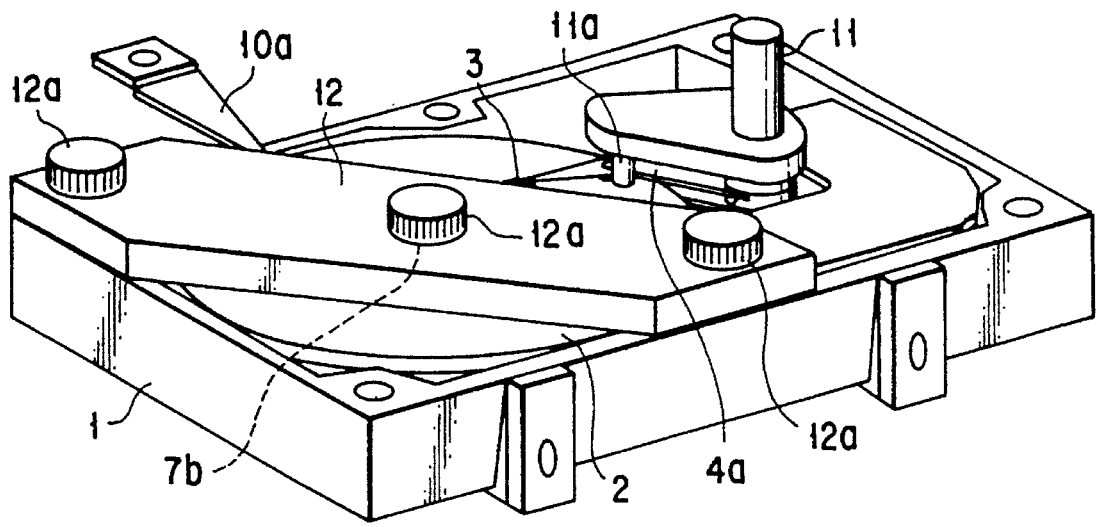
FIGS. 5A and 5B are perspective views illustrating that the rotation shaft is supported by setting a dummy cover by the conventional technique.
Figure 5B:
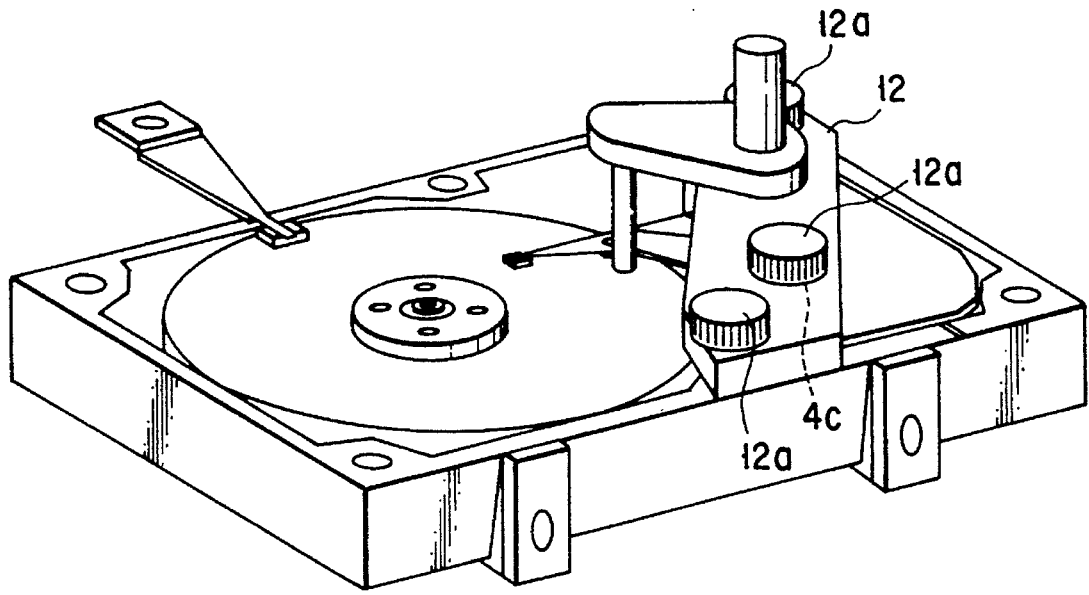
Figure 6:
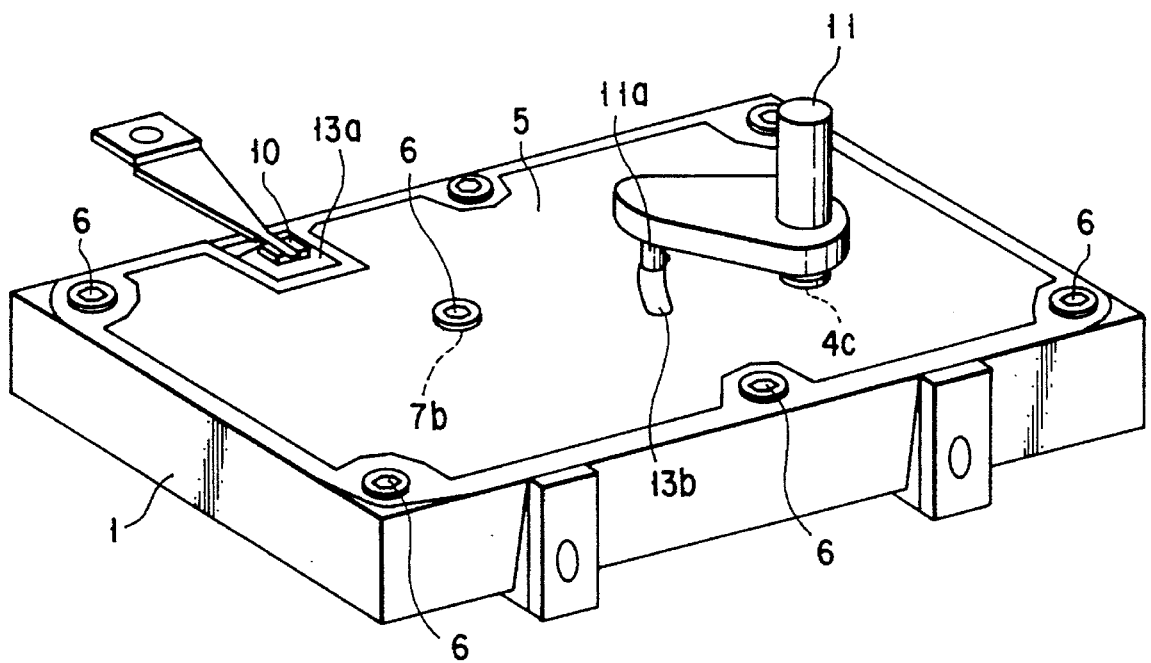
FIG. 6 is a perspective view illustrating that the rotation shaft is supported by setting a top cover having an opening by the conventional technique.
Figure 12:
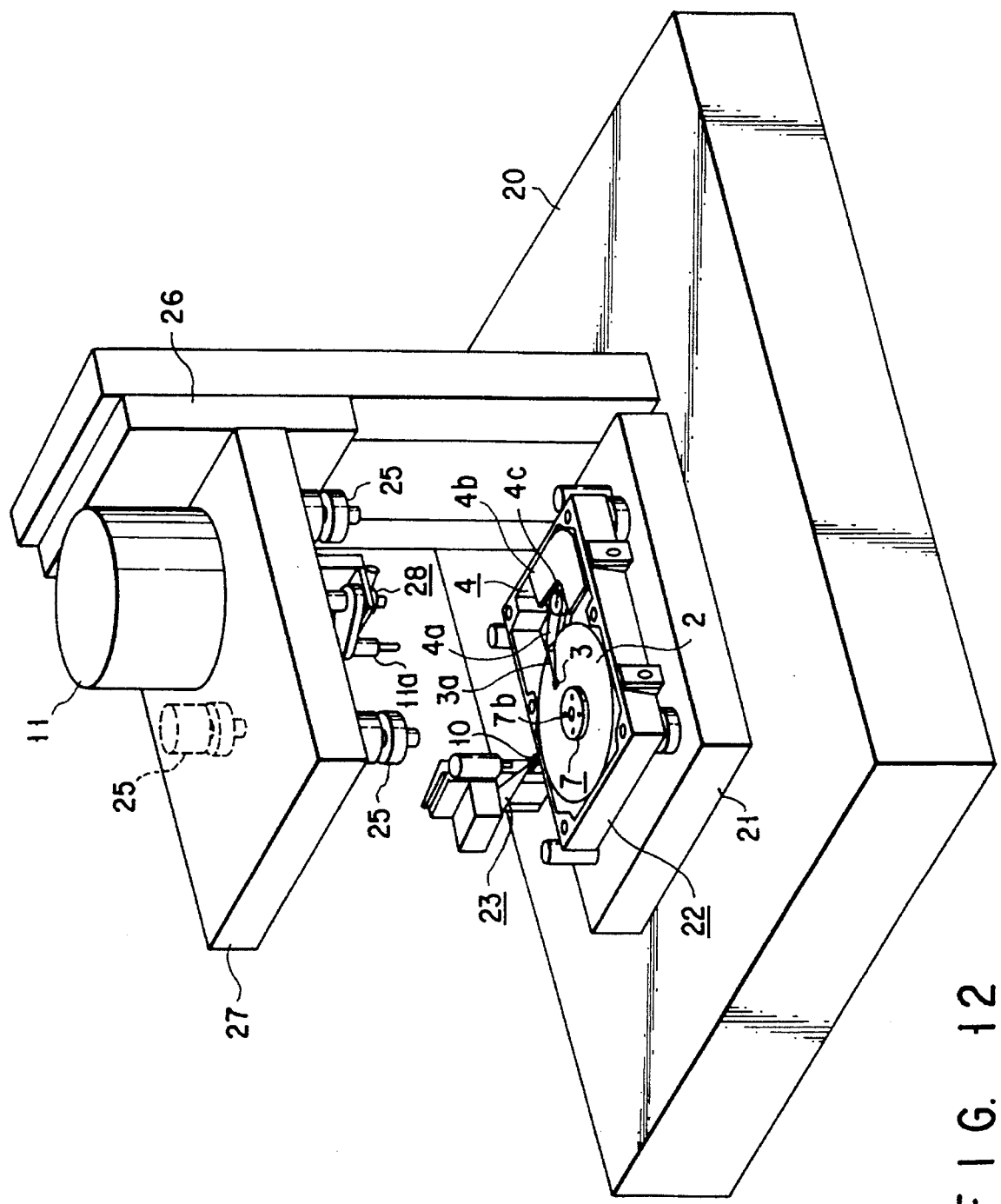
FIG. 12 is a perspective view showing the overall structure of a servo data writing apparatus according to the second embodiment of the present invention.

FIG. 12 is a perspective view of the overall structure of a servo data writing apparatus according to the second embodiment of the present invention. The overall structure of the second embodiment is similar to that of the first embodiment shown in FIG. 7, and both embodiments have many members in common. Therefore, the structural elements which are different from those of the first embodiment will be mainly discussed. Similar to the case of the first embodiment, the apparatus according to the second embodiment includes a lower base 20 of the main body of the apparatus, a standard base 21 for fixing a hard disk drive (HDD) 22, on which servo data is written, and an upper base 27 of the main body. The HDD has the same mechanism as that of the conventional HDD. In the following description, FIGS. 1 and 3A are referred to in accordance with necessity. On the upper base 27, a plurality of vertical-directional clamping mechanisms 25, a both-end supporting mechanism 28 and a positioning actuator mechanism 11 having a positioning pin 11a are set. The above-mentioned both-end supporting mechanism 28 differs from the both-end supporting mechanism 24 described in the first embodiment in the supporting object as will be described later. It should be noted that the functions of the vertical-directional clamping mechanisms 25, the vertical-directional sliding mechanism 26, the positioning actuator mechanism 11 and the clock head mechanism 23 are the same as those of the first embodiment.

The both-end supporting mechanism 24 maintains the rotation shaft 7b in the HDD 22 from which the top cover 5 (FIG. 1) is removed, in the both-end support state, when the HDD 22 is clamped by the vertical-directional clamping mechanisms 25. The both-end supporting mechanism 28 consists of a housing 28a which is the main body of this mechanism, a shaft-supporting piston member 28b, a lock pin member 28c and a spring member 28d. In the housing 24a, the shaft supporting piston member 28b is pressed by the spring member 28d in the direction indicated by the arrow. Further, the housing 28a has a mechanism for maintaining the shaft-supporting piston member 28b pressed such that a portion thereof is located outside. The lock pin member 28c is designed for suppressing the vertical directional movement of the shaft-supporting piston member 28b when the shaft-supporting piston member 28b is in contact with the tip portion of the free end of the rotation shaft 4c.

Next, the operation of the second embodiment will be described.

First, the HDD 22 to which servo data are to be written, is fixed on the standard base 21 as can be seen in FIG. 12. Then, the upper base 27 is moved in the direction where the HDD 22 is located, as driven so by the vertical-directional sliding mechanism 26. Up to this point, the operation is the same as that of the first embodiment.

Next, in accordance with the movement of the upper base 27, the both-end supporting mechanism 22 set on the upper base 27 approaches the HDD 22. During this period, as shown in FIG. 13A, the shaft-supporting piston member 28b contained in the both-end supporting mechanism 28 approaches the tip portion of the free end of the rotation axis 4c.

Further, as can be seen in FIG. 13B, the both-end supporting mechanism 28 moves in the direction indicated by arrow Y1 until the shaft-supporting piston member 28b is brought into full contact with the tip portion of the free end of the rotation shaft 4c. The tip portion of the shaft-supporting piston member 28b has such a shape that it can be brought into full contact with the rotation shaft 4c, for example, a columnar or conical shape when the shaft-supporting piston member 28b is brought into full contact with the rotation axis 4c, the spring member 28d is pressed in the direction indicated by arrow Y2 by reaction. While being pressed, the vertical-directional clamping mechanism 25 is brought into contact with the HDD 22, and this the HDD 22 is clamped (the movement of the upper base 27 is stopped). Thus, as shown in FIG. 14A, the shaft-supporting piston member 28b in the housing 28a is maintained to be in full contact with the rotation shaft 4c by a constant pressure applied by the spring member 28d.

While maintaining this state, as can be seen in FIG. 14B, the lock pin 28c presses the shaft-supporting piston member 28b moves in the direction indicated by arrow X1. Thus, the movement of the shaft-supporting piston member 28b is locked. The lock pin 28c is connected with a piston of an air cylinder (not shown). Note that the lock pin 28c may be a piston of the air cylinder. The air cylinder actuator (not shown) moves the lock pin 28c by an air pressure.

Next, the disk 2 starts to rotate as it is driven by the spindle motor 7g contained in the disk rotation mechanism 7 in the HDD 22. The positioning actuator mechanism 11 moves the swing arm 4a by using the positioning pin 11a. In this manner, the positioning actuator mechanism 11 positions the head 3 at a predetermined position on the disk 2. During this period, the head movement mechanism 4 moves the head 3 towards the adjacent circumferential side of the disk 2 by controlling the swing arm 4a. The positioning pin 11a controls the swing arm 4a such as to oppose the movement force of the head movement mechanism 4, thus positioning the head 3. When the positioning is completed, servo data is written by the head 3. It should be noted that the HDD 22 includes a servo data writing circuit (not shown) for carrying out the writing of servo data with the head 3. In an actual execution of the writing of servo data, a reference clock signal is recorded on the disk 2 by the clock head 10.

During the servo data writing process, the rotation shaft 4c which supports the swing arm 4a is sufficiently pressed by the shaft supporting piston member 28b, and therefore the both-end support state is maintained. Consequently, the non-repeatable vibration of the rotation shaft 4c caused by the rotation of the spindle motor 7g is suppressed, and the non-repeatable vibration is not propagated to the swing arm 2. Therefore, the servo data can be written at a high accuracy without mixing an undesired component into the data due to the vibration.

When the servo data writing process is completed, the lock pin member 28c is moved in the direction indicated by arrow X2 by the air cylinder (not shown) as can be seen in FIG. 15A. Thus, the locked state of the shaft-supporting piston member 28b is released. Then, the upper base 27 is moved in the direction away from the HDD 22, as driven by the vertical-directional sliding mechanism 26. Therefore, as can be seen in FIG. 15B, the both-end supporting mechanism 28 moves in the direction away from the rotation shaft 4c (as indicated by arrow Y3). When the upper base 27 is separated sufficiently away from the HDD 22, the HDD 22 is removed from the standard base 21. Then, the top cover 5 is set on the HDD 22.

A series of the above-described operations is executed by the computer (not shown) provided in the servo data writing apparatus as in the first embodiment.

As is clear from the above description of the operation, the operational principle of the both-end supporting mechanism 28 is substantially the same as that of the both-end supporting mechanism 24 of the first embodiment. However, the supporting object of the mechanism 28 is different from that of the mechanism 24. In particular, the both-end supporting mechanism 28 supports the rotation shaft 4c so as not to propagate the vibration to the swing arm 4a which holds the head 3. In this respect, the supporting mechanism 28 differs in operation from the both-end supporting mechanism 24 which is designed to avoid applying the vibration to the disk 2.

Further, the servo data writing apparatus according to the second embodiment can handle an HDD of the type having a rotation shaft of the one-end supporting mechanism as in the case of the first embodiment. For withdrawing the shaft supporting piston member from the rotation shaft 4c, there are two techniques, i.e. the first technique is that the both-end supporting mechanism 28 including the shaft-supporting piston member 28b is entirely withdrawn, and the second technique is that only the shaft-supporting piston member 28b is withdrawn. The operational principle of the withdrawal is the same as those shown in FIGS. 11A and 11B of the first embodiment.

As described, according to the second embodiment, the non-repeatable vibration of the rotation shaft 4c is sufficiently suppressed in similar to or better than the conventional method in which a dummy cover is provided, or a top cover having an opening is set. Further, the non-repeatable vibration is not propagated to the swing arm 4 or head 3. Therefore, a highly accurate servo data writing which keeps the vibration components to a minimum can be achieved.

Moreover, according to this embodiment, when performing a servo data writing process, the setting or removing of a dummy cover, or a top cover having an opening, which is time and labor consuming, is not required. Further, during the operation of the servo data writing apparatus, dusts do not easily enter the inside of the HDD 22. Furthermore, since it is not necessary to set or remove the cover and the like, a special processing such as providing an opening in the cover and the like, or a work of sealing an opening is no longer required.

Moreover, in any case where the HDD 22 having the rotation shaft of the both-end supporting mechanism, or the HDD 22 having the rotation shaft of the one-end supporting mechanism is set on the standard base, the supporting or non-supporting state for the rotation shaft can be easily and quickly switched. Consequently, an servo data writing process appropriate for the type of a supporting mechanism can be achieved.

As described, in the first embodiment, the rotation shaft 7b which supports the disk 2 is supported, and therefore the non-repeatable vibration is not propagated to the disk 2 while writing servo data thereon. In the meantime, in the second embodiment, the rotation shaft 4c which supports the swing arm 4a is supported, and therefore the non-repeatable vibration is not propagated to the swing arm 4c while writing servo data on the disk when the first and second embodiments are combined together, a more accurate servo data writing process can be achieved. In such a case, the both-end supporting mechanism 24 of the first embodiment and the both-end supporting mechanism 28 of the second embodiment are provided on the same upper base 27. With this structure, the rotation shaft 7b which supports the disk 2 and the rotation shaft 4c which supports the swing arm 4a can be supported both at the same time while writing servo data.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A servo data writing apparatus comprising: a magnetic disk device including a rotation mechanism for rotating a recording medium, said rotation mechanism including a rotation shaft having a free end, a head mechanism for writing servo data as positioning data on said recording medium, and a carriage mechanism for moving said head mechanism;

a base for fixing said magnetic disk device;

head positioning means for positioning said head mechanism; and first supporting means for supporting the free end of the rotation shaft of said recording medium so as to suppress a vibration caused by a rotation of said rotation mechanism;

wherein said first supporting means includes a piston mechanism for supporting the free end of the rotation shaft of said recording medium, and a lock mechanism for holding a movement of said piston mechanism.

2. The apparatus according to claim 1, wherein said piston mechanism includes:

a piston;

a cylinder for slidably enclosing said piston;

a spring for pressing said piston in a direction where the rotation shaft is located; and a movement mechanism for moving said piston so as to bring said piston into contact with the free end of the rotation shaft of said recording medium when writing said servo data in the case where said magnetic disk device has a both-end supporting mechanism, and withdrawing said piston to a predetermined position in said cylinder to avoid contact with the free end of the rotation shaft of said recording medium when writing said servo data in the case where said magnetic disk device has a one-end supporting mechanism.

3. The apparatus according to claim 1, further comprising a movement mechanism for moving said first supporting means so as to bring said first supporting means into contact with the free end of the rotation shaft of said recording medium when writing said servo data in the case where said magnetic disk device has a both-end supporting mechanism, and withdrawing said first supporting means to a predetermined position so as to avoid contact with the free end of the rotation shaft of said recording medium when writing said servo data in the case where said magnetic disk device has a one-end supporting mechanism.

4. A servo data writing apparatus comprising:

a magnetic disk device including a rotation mechanism for rotating a recording medium, a head mechanism for writing servo data as positioning data on said recording medium, and a carriage mechanism for moving said head mechanism;

a base for fixing said magnetic disk device;

head positioning means for positioning said head mechanism;

first supporting means for supporting a free end of a rotation shaft of said recording medium so as to suppress a vibration caused by a rotation of said rotation mechanism; and a movement mechanism for moving said first supporting means so as to bring said first supporting means into contact with the free end of the rotation shaft of said recording medium when writing said servo data in the case where said magnetic disk device has a both-end supporting mechanism, and withdrawing said first supporting means to a predetermined position so as to avoid contact with the free end of the rotation shaft of said recording medium when writing said servo data in the case where said magnetic disk device has a one-end supporting mechanism.

5. A servo data writing apparatus comprising:

a magnetic disk device including a rotation mechanism for rotating a recording medium, a head mechanism for writing servo data as positioning data on said recording medium, and a carriage mechanism for moving said head mechanism;

a base for fixing said magnetic disk device;

head positioning means for positioning said head mechanism; and second supporting means for supporting a free end of a rotation shaft of said carriage mechanism so as to suppress a vibration caused by a rotation of said rotation mechanism.

6. The apparatus according to claim 5, wherein said second supporting means includes a piston mechanism for supporting the free end of the rotation shaft of said carriage mechanism, and a lock mechanism for holding a movement of said piston mechanism.

7. The apparatus according to claim 6, wherein said piston mechanism includes:

a piston;

a cylinder for slidably enclosing said piston;

a spring for pressing said piston in a direction where the rotation shaft is located; and a movement mechanism for moving said piston so as to bring said piston into contact with the free end of the rotation shaft of said carriage mechanism when writing said servo data in the case where said magnetic disk device has a both-end supporting mechanism, and withdrawing said piston to a predetermined position in said cylinder to avoid contact with the free end of the rotation shaft of said carriage mechanism when writing said servo data in the case where said magnetic disk device has a one-end supporting mechanism.

8. The apparatus according to claim 5, further comprising a movement mechanism for moving said second supporting means so as to bring said second supporting means into contact with the free end of the rotation shaft of said carriage mechanism when writing said servo data in the case where said magnetic disk device has a both-end supporting mechanism, and withdrawing said second supporting means to a predetermined position so as to avoid contact with the free end of the rotation shaft of said carriage mechanism when writing said servo data in the case where said magnetic disk device has a one-end supporting mechanism.

9. The apparatus according to claim 6, further comprising a movement mechanism for moving said second supporting means so as to bring said second supporting means into contact with the free end of the rotation shaft of said carriage mechanism when writing said servo data in the case where said magnetic disk device has a both-end supporting mechanism, and withdrawing said second supporting means to a predetermined position so as to avoid contact with the free end of the rotation shaft of said carriage mechanisms when writing said servo data in the case where said magnetic disk device has a one-end supporting mechanism.

10. A method of writing servo data at a predetermined position of a recording medium, using a magnetic disk device including a rotation mechanism for rotating said recording medium, said rotation mechanism including a rotation shaft having a free end, a head mechanism for writing said servo data as positioning data on said recording medium, and a carriage mechanism for moving said head mechanism, comprising the steps of:

fixing said magnetic disk device;

positioning said head mechanism;

firstly supporting the free end of the rotation shaft of said recording medium by a piston mechanism so as to suppress a vibration caused by a rotation of said rotation mechanism; and holding a movement of said piston mechanism.

11. The method according to claim 10, wherein said first supporting step includes:

enclosing a spring for pressing a piston of said piston mechanism in a direction where the rotation shaft is located and moving said piston so as to bring said piston into contact with the free end of the rotation shaft of said recording medium when writing said servo data in the case where said magnetic disk device has a both-end supporting mechanism, and withdrawing said piston to a predetermined position so as to avoid contact with the free end of the rotation shaft of said recording medium when writing said servo data in the case where said magnetic disk device has a one-end supporting mechanism.

12. The method according to claim 10, further comprising the step of:

moving said piston mechanism so as to bring said piston mechanism into contact with the free end of the rotation shaft of said recording medium when writing said servo data in the case where said magnetic disk device has a both-end supporting mechanism, and withdrawing said piston mechanism to a predetermined position so as to avoid contact with the free end of the rotation shaft of said recording medium when writing said servo data in the case where said magnetic disk device has a one-end supporting mechanism.

13. A method of writing servo data at a predetermined position of a recording medium, using a magnetic disk device including a rotation mechanism for rotating said recording medium, said rotation mechanism including a rotation shaft having a free end, a head mechanism for writing said servo data as positioning data on said recording medium, and a carriage mechanism for moving said head mechanism, comprising the steps of:

fixing said magnetic disk device;

positioning said head mechanism;

supporting the free end of the rotation shaft of said recording medium so as to suppress a vibration caused by a rotation of said rotation mechanism; and moving a piston mechanism so as to bring said piston mechanism into contact with the free end of the rotation shaft of said recording medium when writing said servo data in the case where said magnetic disk device has a both-end supporting mechanism, and withdrawing said piston mechanism to a predetermined position so as to avoid contact with the free end of the rotation shaft of said recording medium when writing said servo data in the case where said magnetic disk device has a one-end supporting mechanism.

14. A method of writing servo data at a predetermined position of a recording medium, using a magnetic disk device including a rotation mechanism for rotating said recording medium, a head mechanism for writing said servo data as positioning data on said recording medium, and a carriage mechanism for moving said head mechanism, comprising the steps of:

fixing said magnetic disk device;

positioning said head mechanism;

supporting the free end of the rotation shaft of said carriage mechanism by means of a piston mechanism so as to suppress a vibration caused by a rotation of said rotation mechanism; and holding a movement of said piston mechanism.

15. The method according to claim 14, wherein said supporting step includes:

enclosing a spring for pressing said piston in a direction where the rotation shaft is located, thereby constituting said piston mechanism; and moving said piston so as to bring said piston into contact with the free end of the rotation shaft of said recording medium when writing said servo data in the case where said carriage mechanism has a both-end supporting mechanism, and withdrawing said piston to a predetermined position so as to avoid contact with the free end of the rotation shaft of said recording medium when writing said servo data in the case where said carriage mechanism has a one-end supporting mechanism.

16. A method of writing servo data at a predetermined position of a recording-medium, using a magnetic disk device including a rotation mechanism for rotating said recording medium, a head mechanism for writing said servo data as positioning data on said recording medium, and a carriage mechanism for moving said head mechanism, comprising the steps of:

fixing said magnetic disk device;

positioning said head mechanism;

supporting the free end of the rotation shaft of said carriage mechanism by means of a piston mechanism so as to suppress a vibration caused by a rotation of said rotation mechanism; and moving said piston mechanism so as to bring said piston mechanism into contact with the free end of the rotation shaft of said recording medium when writing said servo data in the-case where said carriage mechanism has a both-end supporting mechanism, and withdrawing said piston mechanism to a predetermined position so as to avoid contact with the free end of the rotation shaft of said recording medium when writing said servo data in the case where said carriage mechanism has a one-end supporting mechanism.

17. The method according to claim 14, further comprising the step of:

moving said piston mechanism so as to bring said piston mechanism into contact with the free end of the rotation shaft of said recording medium when writing said servo data in the case where said carriage mechanism has a both-end supporting mechanism, and withdrawing said piston mechanism to a predetermined position so as to avoid contact with the free end of the rotation shaft of said recording medium when writing said servo data in the case where said carriage mechanism has a one-end supporting mechanism.

\* \* \* \* \*